United States Patent [19]

Larson et al.

[11] 4,433,011

[45] Feb. 21, 1984

[54] TRACKING NOZZLE FOR VISCOUS FLUID APPLICATION

[75] Inventors: Douglas A. Larson, Chicago, Ill.; Kenneth L. Tacke; Craig A. White, both of Woodinville, Wash.; Ronald E. Paxton, Seattle, Wash.

[73] Assignee: Rockcor, Inc., Redmond, Wash.

[21] Appl. No.: 328,607

[22] Filed: Dec. 8, 1981

[51] Int. Cl.³ .................. B60C 21/08; B29H 13/00
[52] U.S. Cl. ................................ 427/231; 118/318; 118/321; 152/346; 152/347; 156/115; 156/394.1
[58] Field of Search .............. 152/346, 347; 118/318, 118/321; 156/115, 394 R; 422/231

[56] References Cited

U.S. PATENT DOCUMENTS

| Re. 14,765 | 12/1919 | Urbach . | |
|---|---|---|---|
| 1,471,787 | 10/1923 | Gammeter . | |
| 1,474,654 | 11/1923 | Urbach . | |
| 2,700,624 | 1/1955 | Wagner et al. . | |
| 3,542,340 | 11/1970 | Pelsl | 254/50.3 |
| 3,790,134 | 2/1974 | Matteuzzi | 254/50.2 |
| 3,825,965 | 7/1974 | Root et al. | 118/318 X |
| 3,962,987 | 6/1976 | Brandl | 118/44 |
| 3,977,358 | 8/1976 | Stroobants | 118/2 |
| 4,025,981 | 5/1977 | Root et al. | 118/317 X |
| 4,115,172 | 9/1978 | Baboff | 156/115 |
| 4,206,008 | 6/1980 | Tacke et al. | 156/115 |
| 4,262,624 | 4/1981 | Soeda et al. | 152/347 X |
| 4,281,621 | 8/1981 | Tacke et al. | 118/500 |
| 4,289,009 | 9/1981 | Tacke et al. | 118/306 |

FOREIGN PATENT DOCUMENTS

7230166 3/1974 France .
167628 11/1965 U.S.S.R. .

Primary Examiner—Michael R. Lusignan
Attorney, Agent, or Firm—Dowrey & Cross

[57] ABSTRACT

A tracking nozzle is provided for applying a viscous tire sealant to the interior of the tire. The tracking nozzle may be adjusted to move across the interior surface of the tire in a presettable number of steps, each step being of a preselected width. The amount of sealant applied in each of these discrete sealant application locations may be varied in order to produce a sealant layer of any desired thickness and contour.

22 Claims, 7 Drawing Figures

TRACKING NOZZLE FOR VISCOUS FLUID APPLICATION

FIELD OF THE INVENTION

The present invention is directed to a method and apparatus for applying a viscous fluid to a toroidal object. More particularly, the invention relates to the application of a viscous tire sealant to a tire interior by means of a tracking nozzle which moves between discrete sealant application locations and applies the sealant to the tire at these locations as the tire rotates relative to the tracking nozzle.

DESCRIPTION OF THE PRIOR ART

Manufacturers have been trying for many years to produce commercially acceptable self-sealing tubeless pneumatic tires. Such self-sealing tires not only would eliminate most of the hazards and inconvenience caused by flat tires, but also would render the spare tire superfluous. Automobile manufacturers could then eliminate the spare tire, thereby decreasing the overall vehicle weight while increasing the available storage space in the trunk.

Some manufacturers have applied the tire sealant to the interior of the tire by conventional fluid spraying means. Generally, however, sealants capable of being sprayed onto the tire must be of such low viscosity that extensive curing is required, or they must be dissolved or suspended in a solvent which must later be extracted. Moreover, the low viscosity of these sealants results in their running or pooling during processing, particularly in the side wall area of the tire interior. Spray application is also unsatisfactory because it is difficult if not impossible to control the thickness of the sealant layer so as to provide areas of increased thickness since such contouring is quickly destroyed by the flowing of the sealant.

Another approach to production of a self-sealing tire involves the use of thicker sealants which flow to only a very limited degree. Such sealants are too viscous to be conveniently applied by spraying, and accordingly are applied by extrusion from one or more extrusion dies. Generally, a single layer of the sealant material is applied to the tire and is either butt joined or overlapped to provide a continuous seal. One problem with this approach is that the sealant may shrink slightly, causing the joint to be pulled apart. This not only affects the sealing integrity of the tire in the vicinity of the joint, but also may result in tire imbalance and hence in excessive tire wear. Moreover, as tires are manufactured in numerous sizes and shapes, a manufacturer would be required to maintain a large selection of dies to accommodate each tire configuration. Large purchasers such as vehicle fleet owners and operators may also specify a different contour or sealant thickness which would require the manufacture and maintenance of additional dies.

SUMMARY OF THE INVENTION

These and other problems of prior art sealant applicators are avoided by the present invention which permits the application of a highly viscous sealant composition to tires of varying widths and internal configurations by means of a nozzle which tracks across the tire interior. In one embodiment of the present invention, a tracking nozzle is inserted into the tire interior and the tire is rotated relative thereto. The tracking nozzle in this particular involvement is adjustable to provide a plurality of discrete sealant application positions and applies a predetermined quantity of sealant to the tire in each of these positions. Although the tracking nozzle may be maintained in each position for only one revolution of the tire, in order to promote uniformity of the sealant and avoid separation of the sealant layer, it has been found preferable to apply the sealant at each position over a plurality of revolutions of the tire relative to the nozzle, thus eliminating the problems created by a single layer butt or lapped joint. The rotation of the tire relative to the nozzle may, of course, be accomplished by rotation of either the tire or the nozzle.

The tracking motion of the nozzle is accomplished by means of a pneumatic-hydraulic rotary actuator which receives predetermined quantities of hydraulic fluid from a hydraulic source causing the actuator to move stepwise from one discrete sealant application location to the next. The hydraulic source of the apparatus of the preferred embodiment comprises a double-acting pneumatic cylinder coupled to a hydraulic cylinder. The hydraulic cylinder is connected to a hydraulic fluid reservoir, and check vales are provided in the hydraulic lines. The hydraulic cylinder thus serves as a pump. The stroke of the pneumatic cylinder which operates the piston of the hydraulic cylinder is adjustable in order to regulate the amount of hydraulic fluid pumped for each cycle of operation. Increasing the stroke of the pneumatic cylinder, of course, results in the pumping of an increased amount of hydraulic fluid which in turn results in an increased spacing between the tracking nozzle sealant application locations.

Operation of the pneumatic cylinder may be controlled by a programmable controller or counter circuit which determines the length of time the nozzle spends in any given position and hence the amount of sealant applied to the tire at that position. Preferably, the sealant is provided to the tracking nozzle by a pneumatically actuated piston-type positive displacement pump which can be adjusted to increase or decrease the amount of sealant provided by each stroke thereof. The counter circuit may then control the tracking nozzle to remain in each sealant position for a predetermined number of pump strokes, which number may be varied from position to position in order to provide a sealant layer of the desired thickness and contour.

The tracking nozzle may begin the application of sealant to the tire adjacent one sidewall and tracks across the tire to the other sidewall. Exemplarily, the sealant could be applied as follows: in the first position adjacent the outer sidewall of the tire, the tracking nozzle remains in its first position until the sealant pump has cycled four times; the nozzle then remains in the subsequent sealant application positions for one cycle of the pump each, until it reaches the last position adjacent the inner sidewall of the tire where it remains until three pump strokes of sealant have been applied. As hereinafter described, the tracking nozzle may be controlled to provide such a pattern of sealant application by means of three cascaded counter circuits. However, if it is desired to apply an increasing number of pump strokes of sealant to any other locations, additional counters could be added to cause the nozzle to remain in those locations until the desired volume of sealant has been applied.

The thickness of the sealant coat may be increased or decreased according to any purchaser's requirements by increasing the total number of sealant application positions. Additionally, the stroke of the sealant pump may be increased or decreased to adjust the amount of sealant applied to the tire in any one position. Thus, it will be apparent that the present invention provides a method and apparatus for the application of sealant to a tire interior in any desired contour and thickness. Moreover, such sealant layer may be applied without the need for separate extrusion dies for each tire and sealant configuration.

DETAILED DESCRIPTION OF THE PREFERRED EMBODIMENT

Figure 1:
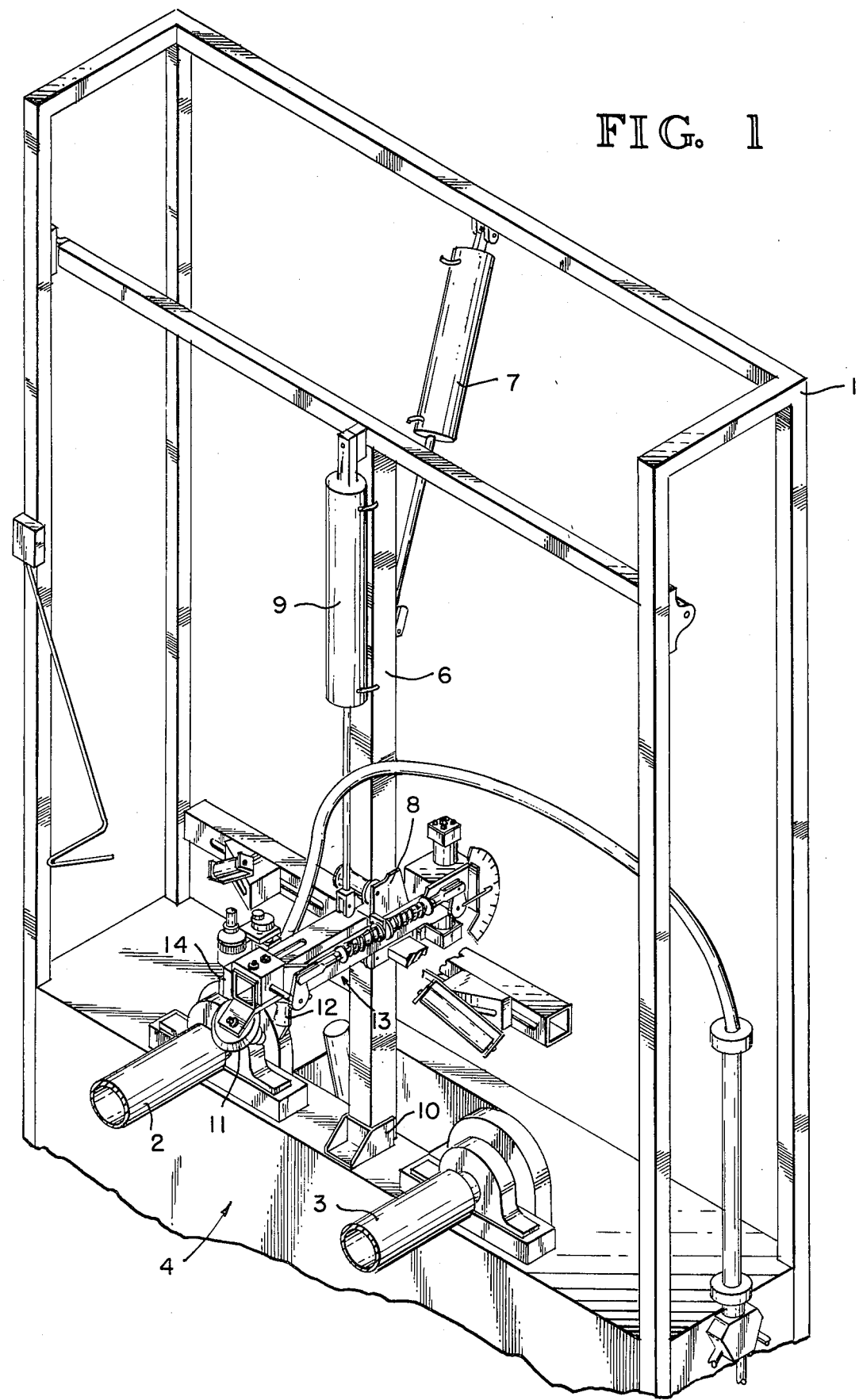
FIG. 1 is an isometric view of a tracking nozzle according to the present invention mounted on an apparatus for inserting the nozzle into the interior of a tire.

The tracking nozzle of the present invention may be used with any positioning apparatus capable of moving it into position in the interior section of a tire. FIG. 1 discloses one such positioning apparatus which includes a generally rectangular frame 1 to which are mounted two tire supporting rollers 2, 3 for supporting a tire at the sealant application station 4. At least one of these rollers is powered to rotate the tire during application of the sealant.

A support arm 6 is pivotally mounted on the frame 1 and is movable between an advanced position proximate to the sealant application station 4 and a retracted position removed therefrom by means of a double-acting pneumatic cylinder 7. A carriage 8 is mounted on the support arm 6 and is moved therealong between upper and lower positions also by means of a double-acting pneumatic cylinder 9. The position of the support arm 6 and the carriage 8 are monitored by means of limit switches (not shown), and the free end of the support arm is supported in the advanced position by means of a guide 10. Tire spreading rollers 11, 12 are mounted on the carriage 8 for engaging and spreading the beads of a tire. The tracking nozzle assembly 13 is also mounted on the carriage 8 and includes a sealant application nozzle 14 located in the vicinity of the spreading rollers 11, 12 for insertion into the tire interior.

Figure 2:
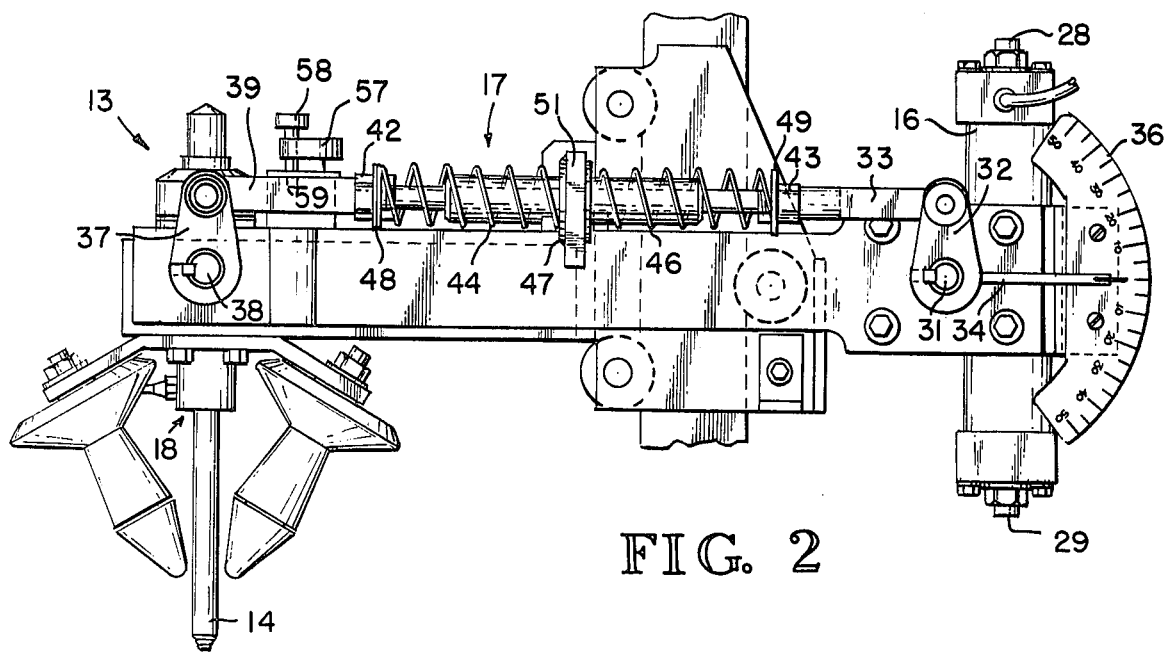
FIG. 2 is a side elevation of the tracking nozzle according to the present invention.
Figure 3:
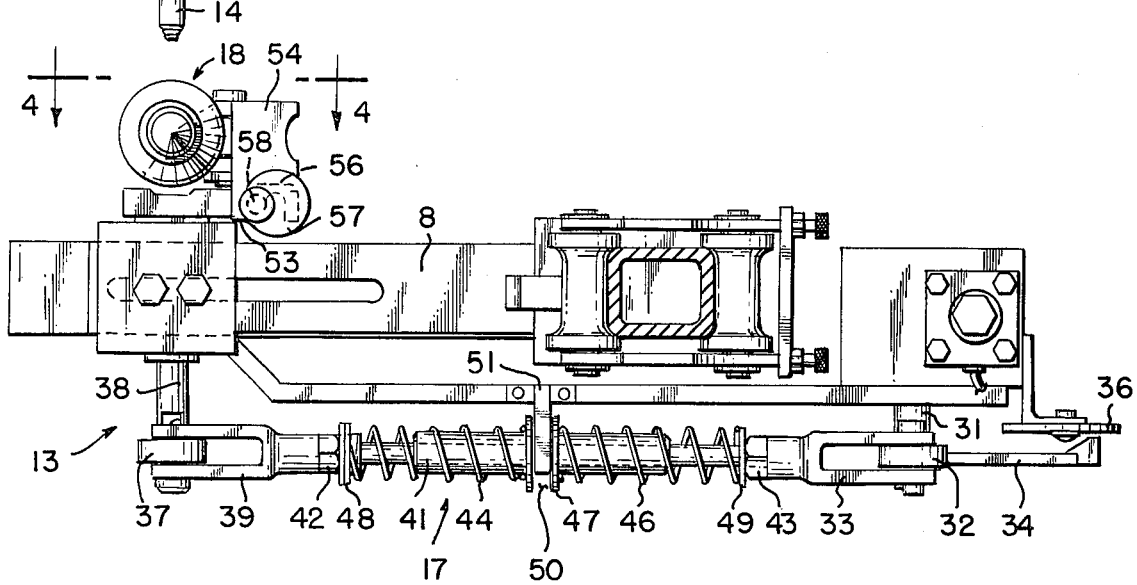
FIG. 3 is a top plan view of the tracking nozzle of FIG. 2.
Figure 4:
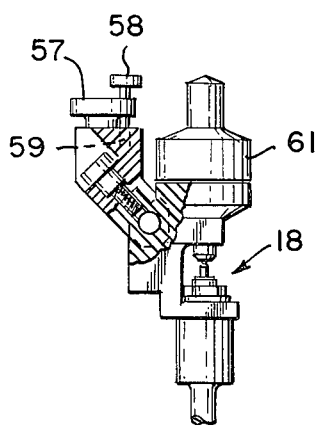
FIG. 4 is a partial side elevation of the sealant nozzle of FIGS. 2 and 3 with parts broken away.

The tracking nozzle assembly 13, shown in greater detail in FIGS. 2-4 includes a rotary actuator 16, connecting rod assembly 17, and nozzle assembly 18. The rotary actuator 16 is mounted on the carriage 8 in a location remote from the nozzle assembly 18 such that, when the support arm 6 is in its retracted position, the actuator 16 is readily available for adjustment or maintenance. This actuator 16, shown schematically in FIG. 5, comprises a housing 19 which forms two fluid power cylinders 21, 22. Two opposed pistons 23, 24 located in the cylinders 21, 22 are connected to opposite ends of a gear rack 26. A pinion gear 27, rotatably mounted to the housing 19 is engaged with the rack and provides the rotary output of the actuator 16. Two adjustable stops 28, 29 are provided for limiting the travel of the pistons, and hence the rotary output of the actuator 16. These stops thus determine the extreme positions to which the tracking nozzle can be deflected.

Again referring to FIGS. 2-4, the rotary output of the actuator 16 is transmitted to the connecting rod assembly 17 by means of a shaft 31 which extends through the carriage 8. A crank arm 32 is mounted on the shaft 31 and is pivotably attached to one end of the connecting rod assembly 17 by means of a yoke 33. An indicator needle 34 is also connected to the crank arm and indicates the rotational position of the shaft by means of a protractor 36 mounted on the carriage 8. A second crank arm 37 is connected to the other end of the connecting rod assembly 17 by means of a second yoke 39 and transmits the force received therefrom to the tracking nozzle 14 by means of a second shaft 38 which extends through the carriage 8 and is journaled therein.

The connecting rod assembly 17 includes a cylindrical shaft 41 with threaded ends which are received by corresponding threaded bores in the ends of the two yokes 33, 39. Rotation of the shaft 41 relative to the yokes is prevented by means of lock nuts 42, 43, also threaded onto the shaft 41. The overall length of the combined shaft 41 and yokes 33, 39 can thus be adjusted by loosening one of the jam nuts 42, 43 and rotating the corresponding yoke 33, 39 relative to the shaft 41.

The connecting rod assembly 17 also includes two centering springs 44, 46 which surround the shaft 41 and are separated by an annular slide 47 carried by the shaft. The uncompressed length of the two springs is greater than that of the shaft 41. Two washers 48, 49 are also mounted adjacent the two ends of the shaft 41 and are maintained in contact with the lock nuts 42, 43 by the two springs 44, 46 which are compressed therebetween. A centering tab 51 is mounted on the carriage 8 adjacent the connecting rod assembly 17 and engages a circumferential groove 50 in the slide 47 to bias the connecting rod assembly to a centered position.

The nozzle assembly 18 is mounted on the distal end of the second shaft 38 and includes a shaft mount 53 and nozzle mount 54 which are slidably engaged by means of a dovetail connection 56. An adjustment screw 57 is journaled in the shaft mount 53 and threadedly engaged with the nozzle mount 54 to provide vertical adjustment of the nozzle mount 54 relative to the shaft 38 and shaft mount 53. A locking pin 58 prevents rotation of the adjustment screw during operation of the apparatus. This pin is threaded in the head of the adjusting screw 57 and extends into a bore 59 in the shaft mount 53. The nozzle 13 is carried by the nozzle mount 54 and includes a valve 61 for controlling the flow of sealant.

The position of the rotary actuator, and hence the tracking nozzle, is controlled by means of the fluid power system. This system, illustrated schematically in FIG. 5, includes an adjustable pump or booster 62 for supplying hydraulic pressure to the rotary actuator 16. The adjustable booster, best shown in FIG. 6, includes a double ended pneumatic cylinder 63 connected to a hydraulic cylinder 64. The rod 66 on one end of the piston 67 of the pneumatic cylinder 63 also serves as the piston of the hydraulic cylinder 64. Since the area of the piston of the pneumatic cylinder 63 is greater than the cross-sectional area of the rod 66, the pressure output of the hydraulic cylinder 64 is greater than the input pressure of the pneumatic cylinder 53 by a factor of the ratio of the area of the two cylinders. In the present embodiment, the hydraulic pressure is approximately four times greater than the pneumatic pressure.

Each rightward stroke of the pneumatic cylinder 63 causes the displacement of a predetermined volume of hydraulic fluid by the rod 66. This volume is controlled by the pneumatic cylinder stroke adjustment nut 68 which is threaded onto the end of the pneumatic cylinder rod 66 at the end opposite the hydraulic cylinder 64. A lock nut 69 is also threaded onto the rod for maintaining the position of the adjustment nut 68. This nut 68 bears against the housing 1 of the booster 62 to limit the travel of the rod 66.

The pneumatic cylinder has two ports 71, 72 located on opposite sides of the piston 67. These ports are connected to the pneumatic control circuit of FIG. 5 which alternately vents them to atmospheric pressure and passes compressed air therethrough to move the piston 67 to the right or left. The hydraulic cylinder 64 has an inlet port 73 connected to the hydraulic fluid reservoir 74 and an outlet port 76 for supplying pressurized hydraulic fluid to the rotary actuator 16. An unpressurized chamber 77 is located between the pneumatic and hydraulic cylinders 63, 64. This chamber 77 receives any hydraulic fluid which may leak from the hydraulic cylinder and returns it to the hydraulic fluid reservoir 74 via the port 78 and return line 79.

Figure 5:
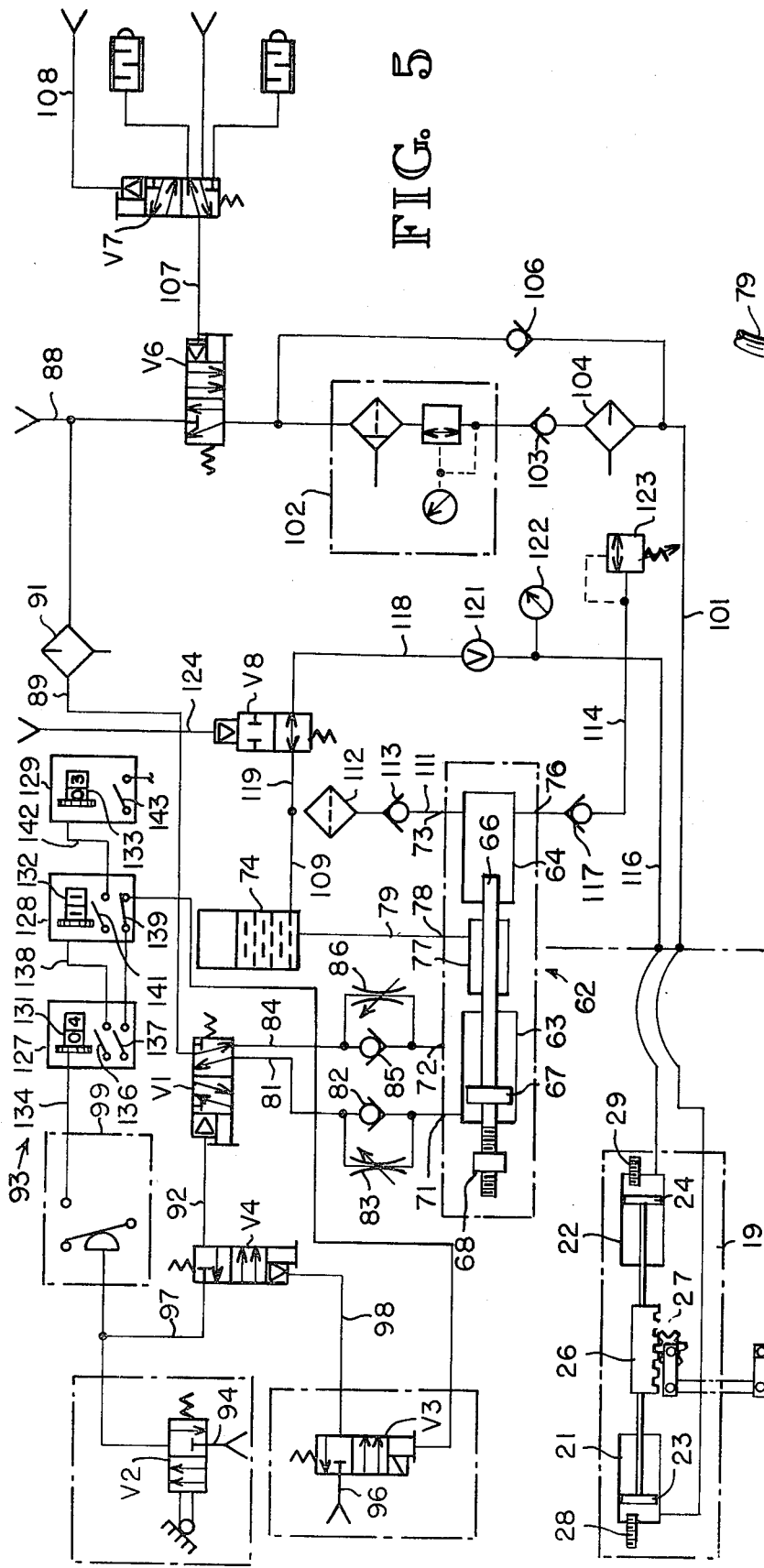
FIG. 5 is a schematic representation of the hydraulic and pneumatic circuits of the tracking nozzle system.
Figure 6:
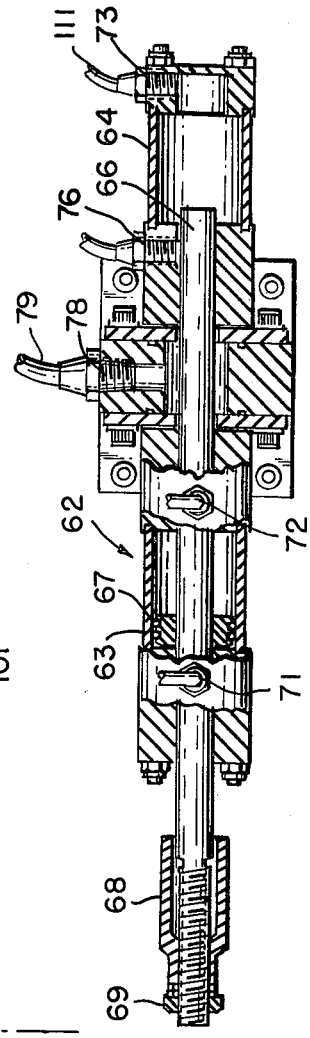
FIG. 6 is a side elevation of the hydraulic booster of FIG. 5 with parts broken away.
Figure 7:
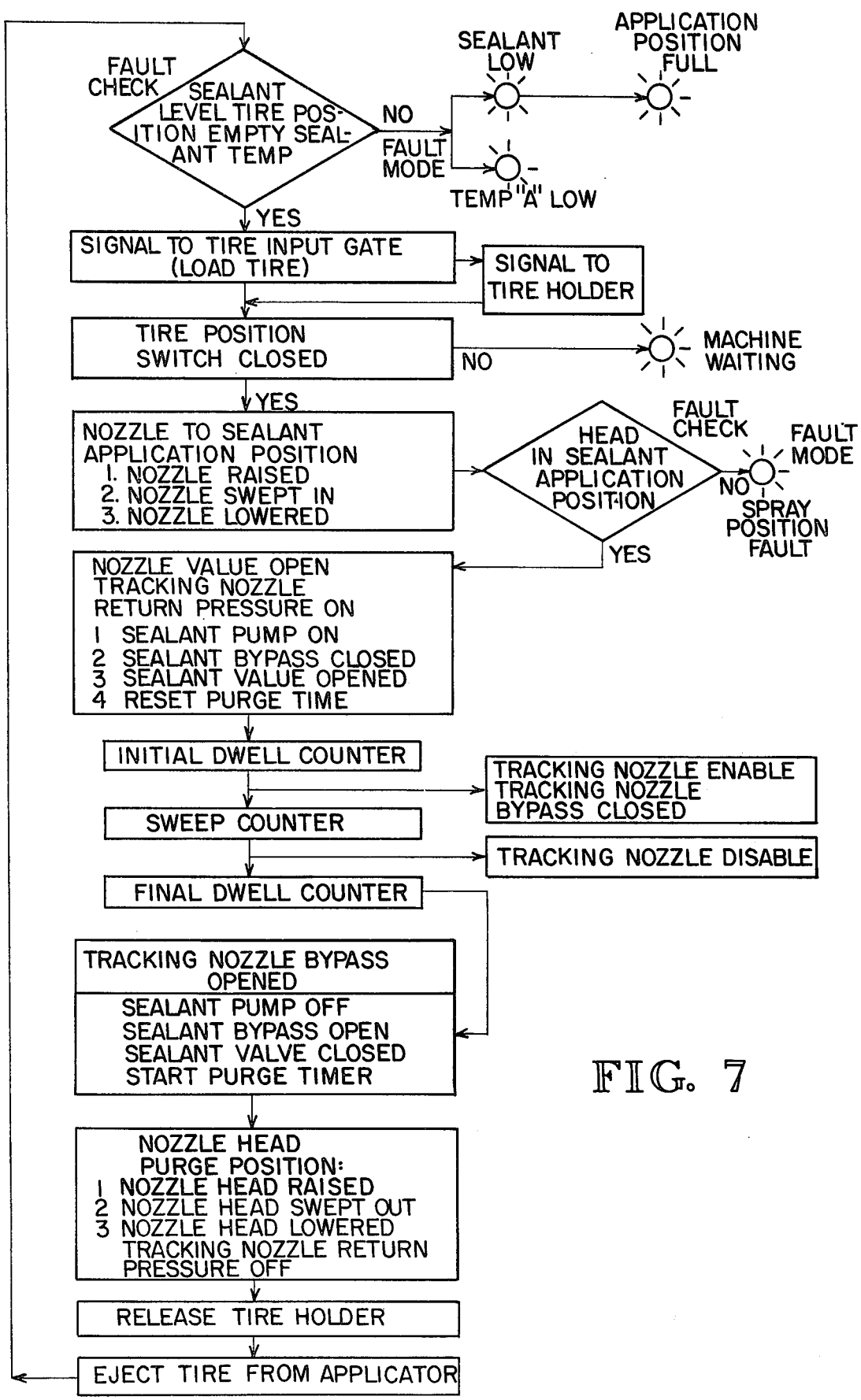
FIG. 7 is a flow diagram detailing the operation of a complete sealant application apparatus according to the present invention.

The first port 71 of the pneumatic cylinder 63 is connected to the pilot operated booster control valve V1 by a pressure supply line 81, a flow restrictor 83 and a check valve 82. The check valve 82 and flow restrictor 83 are connected in parallel. As shown in FIG. 5, the check valve 82 causes the air supplied to the cylinder 63 by the line 81 to pass through the flow resistor 83. Air expelled from the cylinder to the line 81, however, is vented freely through the check valve. The second port 72 of the booster 62 is similarly connected to the valve V1 by a pressure supply line 84, check valve 85 and flow resistor 86. The valve V1, in turn is connected to a high pressure air supply line 88 by a pressure supply line 89. A lubricator 91 in the line 89 adds lubricant to the supply air. When the valve V1 is in its deenergized position, the high pressure air is supplied to the line 84 to move the piston 67 to the left. The other line 81 is simultaneously vented. In its energized position, the valve V1 supplies the pressurized air to the first line 81 and vents the second line 84, causing the piston to move to the right.

The booster control valve V1 is energized by means of a pneumatic pilot signal supplied by pilot line 92. This signal is generated by the operation of the pump stroke counter valve V2, the timer controlled pilot valve V3 and the pilot enable valve V4. The pump stroke sensor valve V2 is a normally closed valve which is mechanically actuated to open once for each stroke of the sealant supply pump (not shown). This pump is a conventional, air operated, reciprocating positive displacement pump, the output shaft of which includes a cam which engages and opens the valve V2 once each stroke. The counter output valve V3 is a normally closed, electrically activated valve which is operated by the counter circuit 93. Both the pump stroke sensor valve V2 and the counter output valve V3 are connected to pressurized air supply lines. The pilot control valve V4 is connected to the pump stroke sensor valve V2 by the pressure line 97 and to the counter output valve V3 by the pilot line 98. When the counter output valve V3 is energized, a pilot signal is supplied to the pilot line 98 to energize the pilot control valve V4. Pulses of pressurized air generated by actuation of the pump stroke sensor valve V2 are thereafter transmitted by the pilot control valve V4 and pilot line 92 to energize the booster control valve V1. A pressure actuated switch 99 is also connected to the pump stroke sensor valve V2 and is actuated to send an electrical impulse to the counter circuit 93 for each stroke of the pump.

As shown in FIG. 5, the rotary actuator 19 is also connected to the pneumatic control system. Air is supplied to the pneumatic cylinder 21 from the pressurized air supply line 88 by the pressure line 101. The flow of pressurized air is controlled by the normally closed, pilot actuated rotary actuator control valve V6, a pressure regulator 102, a check valve 103 and a lubricator 104. A second check valve 106, in parallel with the regulator 102, check valve 103 and lubricator 104, provides unrestricted return flow of air from the pneumatic cylinder 21 when the valve V6 is deenergized.

The actuator control valve V6 is operated by a pilot control valve V7 which supplies a pilot signal to the valve V6 by means of the pilot line 107. This normally closed valve is in turn energized by a pilot signal transmitted to it by pilot line 108. The pilot signal which operates this valve is supplied by the limit switch which is opened when the carriage 8 is moved to its lowered position.

Thus, regulated air pressure is supplied to the actuator 19 when the nozzle is positioned in the sealant application position.

The booster 62 supplies hydraulic pressure to cause the nozzle 14 to track across the interior surface of a tire. Hydraulic fluid is supplied to the cylinder 64 from the reservoir 74 by hydraulic lines 109, 111. The hydraulic line 111 is connected to the inlet port 73 of the hydraulic cylinder 64 and includes a filter 112 and a check valve 113 which prevents the reverse flow of hydraulic fluid from the cylinder to the reservoir. When pressurized air is supplied to the first port 71 of the pneumatic cylinder 63, the rod 66 is moved to the right by the piston 67 and displaces hydraulic fluid from the cylinder 64. This hydraulic fluid flows through the hydraulic lines 114, 116 and check valve 117 to the hydraulic cylinder 22 of the rotary actuator 16. As the cross-sectional area of the rod 66 is substantially less than that of the hydraulic piston 24 of the rotary actuator 19, the piston 24 is only moved a short distance for each stroke of the rod 66 of the booster. Furthermore, since the hydraulic pressure produced by the booster is substantially greater than the air pressure supplied to the pneumatic cylinders 21, 63 from the high pressure supply line 88, the piston 24 of the hydraulic cylinder is able to force the piston 23 of the pneumatic cylinder 21 to the left each time the booster 19 is actuated.

Hydraulic fluid can be returned from the hydraulic cylinder 22 of the actuator 19 through the hydraulic lines 116, 118, 119 providing the manual valve 121 and the pilot actuated tracking nozzle bypass valve V8 are open. One of these valves, of course, must be closed in order for any significant hydraulic pressure to be supplied to the hydraulic cylinder 22 of the rotary actuator 19. In normal operation of the tracking nozzle system, the bypass valve V8 is closed by application thereto of a pilot signal transmitted by the pilot line 124. A pressure gauge 122 is connected to the hydraulic line 118 to permit monitoring of the hydraulic pressure supplied to the rotary actuator. A pressure relief valve 123 is likewise connected to the hydraulic circuit and is set to open if an excessive pressure is produced by the booster 62. Such an overpressure condition might occur if the booster were actuated to pump an additional quantity of hydraulic fluid to the hydraulic cylinder 22 of the rotary actuator 19 after the piston 23 of the pneumatic cylinder 21 had been moved to the left into contact with the stop 28. Still referring to FIG. 5, the counter circuit 93 includes three counters 127-129 which may be set by means of thumbwheel switches 131-133 to any desired count number. The first counter 127 receives impulses indicative of the operation of the sealant pump from the pressure actuated switch 99 via the signal line 134. This counter 127 also includes two normally open switches 136, 137. These switches close when the counter 127 has received the pre-selected number of pulses from the pneumatic switch 99. The first of these switches 136 is connected to the signal line 134 and thereafter transmits the signals from the pneumatic switch 99 to the input of the second counter 128 via the signal line 138. The second switch 137 is connected to a source of power and, upon closing, connects the normally closed switch 139 of the second counter 128 to this power source. As with the first counter, the second counter also includes a switch 141 which is connected to the input signal line and which, upon closing, transmits the signals from the pneumatic switch 99 to the next, or third, counter 129 by means of a signal line 142. The two switches 139, 141 of the second timer 128 are, respectively, moved to their open and closed positions when the pre-selected number of input pulses has been received. The switch 139 is connected to the actuator of the counter output valve and energizes this valve to produce a pilot signal when the switch 137 of the first counter 127 is also closed.

The third counter 129 includes a normally open switch 143 which closes when the counter has received its pre-selected number of input signals to indicate that the sealant application has been completed.

In addition to the control functions exercised by the counter circuit 126 and the pneumatic control circuit of FIG. 5, control must be exercised over the sealant applicator in order to position a tire in the sealant application station 4, position the sealant application nozzle in the tire interior and withdraw the nozzle therefrom. Although this control function may be performed manually for example, by means of a control panel, some form of automatic control is preferred in order to free the operator to perform more important tasks. Accordingly, it would be within the skill of one of ordinary skill in the art to program an automatic sequencing device to perform the mechanical control functions. One such device is the switch actuating repeat cycle timer Model TM 17A60405 manufactured by the Eagle Signal Company which employs a series of timing cams rotated on a common shaft to actuate the control switches. Another preferred control device is the programmable controller, Model No. 1772-LN2 supplied by the Allen Bradley Company. Both of these devices are capable of being programmed to perform the functions outlined below. The computing capabilities of the Allen Bradley programmble controller, however, permits the counting functions to be performed by the electronic processor, thus eliminating the need for the separate electronic counters. This modification of the invention will be apparent to those skilled in the art of programming such electronic controllers.

When a tire has been loaded into the sealant application station 4, the pneumatic cylinder 7 is actuated to move the support arm 6 into its advanced position. As mentioned above, when the arm 6 is in this position, a pneumatic valve is opened which supplies pressurized air to the pilot control valve V7. This limit switch also supplies a signal which enables a valve to operate the pneumatic cylinder 9 which lowers the carriage 8 and positions the nozzle 14 in the interior of the tire. When the carriage has been so lowered, a second limit switch is opened to supply a pilot signal to the pilot line 108. As a result, when the nozzle has been positioned in the tire interior, the pilot control valve V7 is opened. A pilot signal is then applied to the actuator control valve V6 which opens to supply pressurized air to the pneumatic cylinder 21. This causes the two pistons 23, 24 to shift to the right until the hydraulic piston 24 comes in contact with the positioning stop 29. At this point, the tracking nozzle is positioned in its initial sealant application position. In order for this slewing of the tracking nozzle 14 to occur, it is of course necessary that the manually operated valve 121 and tracking nozzle bypass valve V8 be in their open positions.

When the tracking nozzle has been positioned in its initial sealant application position, a signal is applied to the pilot line 124 of the tracking nozzle bypass valve V8 to move this valve into its closed position, and the sealant valve 61 of the nozzle assembly 18 is opened. This permits the pneumatic motor of the sealant pump to commence reciprocation and supply of sealant to the nozze. For each stroke of the pump, the pump stroke sensor valve V2 is opened to provide a pneumatic signal to both the pilot enable valve V4 and the pressure actuated switch 99. This switch 99 transmits pulses of electrical energy to the counters 127-129 which count the strokes.

The tracking nozzle remains in its initial position until the first counter 127 has received the preset number of electric pulses, at which time the switch 137 is closed, resulting in the energizing of the counter output valve V3. The switch 136 also closes when the first counter 127 has reached the predetermined pump stroke count, resulting in the pump stroke signals being transmitted to the second counter.

After control has been thus switched to the second counter, each pulse generated by the pump stroke sensor valve is transmitted through the pilot enable valve to the booster control valve. This valve V1 controls the application of high pressure air to the two pneumatic lines 81, 84. In the de-energized position, this valve transmits the pressurized air through the flow restrictor 86 to the right side of the pneumatic piston 67. The valve V1 simultaneously vents that portion of the pneumatic cylinder 63 to the left of the piston 67 to atmospheric pressure by means of the check valve 82. As a result, the piston 67 is forced by the pressurized air to the left, withdrawing the rod 66 from the hydraulic cylinder 64. When the valve V1 is energized, the high pressure air is supplied through the pneumatic line 81 and flow restrictor 83 to the left side of the pneumatic piston 67, and air is vented from the right side of the pneumatic cylinder through the corresponding check valve 85, allowing the pneumatic piston to move to the right. The rightward motion of the pneumatic piston, however, is limited by the cylinder adjustment nut 68 which engages the booster housing. This limiting of the rightward travel of the piston determines the amount of hydraulic fluid pumped from the hydraulic cylinder for each stroke and, accordingly, controls the distance the tracking nozzle moves for each cycle of the booster control valve V1. If a thinner coat of sealant is desired, the stroke of the pneumatic cylinder can be adjusted so as to increase the distance travelled by the tracking nozzle for each cycle of the valve V1.

After the sealant pump has pumped a number of strokes equal to the preselected number entered in the second counter 128 by means of the thumb wheel switches 132, the switch 139 is opened and the switch 141 is closed. When the switch 139 opens, the counter output valve V3 is deenergized, interrupting the pilot signal to the pilot enable valve V4. Thus, regardless of the pressure output signals generated by the pump stroke sensor valve, no further pilot signals can reach the booster control valve V1. Thus, no further displacement of the tracking nozzles occurs.

The closing of the switch 141 enables the third counter 129 which determines the number of strokes of operation of the sealant pump and hence the volume of sealant to be applied to the tire interior in the final tracking nozzle position. This counter receives the pulses from the pressure switch 99 and closes the switch 143 when the present number of pulses has been received. The closing of this switch 143 produces a signal which ends the sealant application cycle. This signal causes the deenergization of the tracking nozzle bypass valve V8 and the closing of the sealant valve 61. The deenergizing of the bypass valve V8 causes it to open and allow the return flow of hydraulic fluid to the reservoir 74 from the hydraulic cylinder 24 of the rotary actuator 16. Since the sealant pump is a pneumatically actuated positive displacement pump, the closing of the valve 61 prevents the further cycling of the sealant pump. In response to the signal generated by the closing of the switch 143, the controller raises the carriage 8 and moves the support arm to its retracted position. This results in the deenergizing of the pilot control valve V7. As a result, the actuator control valve V6 is deenergized, blocking the supply of high pressure air to the pneumatic cylinder 21 of the rotary actuator and venting the cylinder 21 through the check valve 106 to atmospheric pressure. This release of the pneumatic and hydraulic pressure on the rotary actuator allows the centering springs 44, 46 to center the connecting rod assembly and move the nozzle to a vertical position. Thus, the nozzle is centered for withdrawal from the tire.

In the present embodiment, a greater amount of sealant is applied to the tire interior at the initial and final positions of the tracking nozzle, and the remaining tracking nozzle positions receive a uniform amount of sealant equal to one stroke of the pump. However, by cascading a number of counters or by adjusting the program of a programmable controller, the amount of sealant applied at each discrete tracking nozzle position can be increased or decreased to provide any desired contour of the material. In addition, the thickness of the sealant layer can be varied by increasing the number of tracking nozzle positions by means of the thumb wheel switches 132 of the second counter 128 and decreasing the stroke of the booster by means of the cylinder adjusting nut 68. This will result in the application of an amount of sealant equal to one pump stroke in a greater number of more closely spaced tracking nozzle positions.

The apparatus of the present embodiment has been described as traversing the tracking nozzle from a position adjacent one side wall of the tire to a final position adjacent the other side wall. In addition to varying the thickness of the sealant in the tire interior, however, it may also be desired to commence sealant application at the center of the tire, tracking the nozzle first from this position outward to one side wall and then to return to the center position and apply sealant outward therefrom to the second side wall. This can easily be accomplished by modifying the hydraulic cylinder 22 to include a second port to the left of the piston 24. A valve in the hydraulic line 116 could thus switch the transmission of pressurized hydraulic fluid between the two ports to move the piston 24 to either the right or the left. Of course, provisions would have to be made to return unpressurized hydraulic fluid to the reservoir 74, and suitable adjustments would need to be made to the counter and pneumatic control circuitry.

FIG. 8 is a flow diagram detailing the sequence and function of a complete sealant application system which includes the tracking nozzle of the present invention. This diagram is self-explanatory and will enable one skilled in the art of automated machine control to program a digital controller to operate the sealant applicator.

What is claimed is:

1. An apparatus for applying a layer of predetermined dimensions of a viscous flowable material to the interior of a toroidal body comprising:
   dispenser means positionable in the interior of said body for applying a viscous flowable material to the interior thereof in a width less than a predetermined width of the desired layer;
   means for mounting the dispenser in the body
   positioning means operatively associated with the dispenser means for moving the dispenser relative to the body interior;
   means for relatively rotating the body and the dispenser means; and
   control means operatively associated with the positioning means for activating the positioning means to relatively move the dispensing means and body from an initial application position to a final application position during relative rotation of the body and dispenser means such that a layer of material of said predetermined dimensions is applied to the interior surface of the body.

2. The apparatus of claim 1 wherein the dispenser means includes means for providing a controlled flow of the viscous material onto the interior body surface and wherein the control means includes means for activating the positioning means to move the dispenser means in response to the flow of predetermined quantities of said viscous material onto the surface of said body.

3. The apparatus of claim 2 wherein said control means includes means for activating the positioning means to move the dispenser means among a plurality of predetermined dispenser positions.

4. The apparatus of claim 3 wherein said positioning means includes a fluid actuator and said control means includes pump means for providing fluid to said fluid actuator in predetermined volumetric increments whereby said actuator moves said dispenser between a plurality of predetermined positions.

5. The apparatus of claim 4 wherein said control means includes means for activating the pump means to provide fluid to the positioning means in response to the flow of a predetermined volume of said viscous fluid to the dispenser means whereby the thickness of the layer of material at each predetermined position is controlled.

6. The apparatus of claim 1 wherein the dispenser means is pivotably connected to the mounting means and the positioning means includes means for pivotably moving said dispenser means.

7. The apparatus of claim 2 further comprising means for biasing said dispenser into a predetermined position relative to the mounting means.

8. A method for applying a continuous layer of viscous material of predetermined dimensions to the interior of a toroidal body comprising the steps of
positioning a dispenser in the interior of the toroidal body,
providing relative rotation between the body and the dispenser,
dispensing the viscous material onto an interior surface of the body in a width less than the predetermined width of the desired layer,
moving the dispenser relative to the body to produce a layer of the viscous material of said predetermined dimensions.

9. The method of claim 8 wherein the dispenser is moved in response to the dispensing of a predetermined quantity of viscous material to the toroidal body.

10. The method of claim 9 wherein the dispenser is moved between a plurality of predetermined positions and a volume of the viscous material applied to the body at each such position whereby the thickness of the layer at each such position is controlled.

11. An apparatus for applying a layer of flowable viscous material of predetermined dimensions to a surface of a toroidal body comprising in combination:
means for dispensing said viscous material onto said interior surface in a width less than the predetermined width of said layer,
means for moving the dispensing means relative to the body so as to produce a layer of said predetermined dimensions.

12. An apparatus for applying a layer of flowable viscous material of predetermined dimensions to the interior surface of a tire comprising:
a nozzle positionable in the interior of a tire for applying said viscous material to the interior surface of a tire;
means for mounting the nozzle in the interior of a tire;
means for rotating the tire and nozzle relative to one another;
a hydraulic actuator for traversing the nozzle across the tire interior;
means for providing predetermined volumes of hydraulic fluid to the actuator for controlling the actuator to move the nozzle between a plurality of predetermined positions, said means including hydraulic pump means for providing a controlled output of hydraulic fluid;
means for providing the viscous material to the nozzle; and
means for controlling the flow of viscous material to the nozzle and for controlling the pump means to provide a predetermined volume of material to the interior tire surface at each predetermined nozzle position whereby a layer of said material of predetermined dimensions is applied to the tire interior.

13. The method of claim 10 wherein the material is continuously applied to the body in each position over a plurality of relative revolutions of the body and dispenser.

14. An apparatus for applying a layer of flowable viscous material of predetermined dimensions to the surface of a toroidal body comprising:
means for dispensing said viscous material onto said surface in a width less than the predetermined width of said layer; and
means for relatively moving the dispensing means and body in response to the application of a predetermined volume of said viscous material to the body so as to produce a layer of said predetermined dimensions whereby the contour of the material applied to the body is controlled.

15. The apparatus of claim 14 further comprising means for providing relatively rotation of the dispensing means and toroidal body.

16. The apparatus of claim 15 wherein said means for providing relative movement of the dispensing means and body includes means for relatively moving the dispensing means and body between a plurality of discrete dispensing positions spaced axially with respect to the body and wherein said dispensing means includes means for controlling the volume of viscous material dispensed at each such location.

17. The apparatus of claim 16 wherein said dispensing means is controllable to vary the predetermined amount of viscous material applied at each such location.

18. The apparatus of claim 16 wherein said means for relatively moving the dispensing means and body is controllable to vary the spacing between such locations and the number of such locations.

19. A method of applying a layer of viscous material of predetermined dimensions to a toroidal body comprising the steps of:
applying a stream of viscous material to the surface of a toroidal object in a width less than the width of the predetermined layer;
laterally displacing the stream of sealant application relative to the tire; and
controlling the amount of viscous material applied to the body in relation to said lateral displacement of the stream whereby the contour of the viscous material applied to the body is controlled.

20. The method of claim 19 wherein said viscous material is applied along a generally circumferential path, the path of application of the viscous material being displaced in response to the amount of viscous material applied to the toroidal body.

21. The method of claim 20 wherein the point of application of viscous material is displaced relative to the body such that the viscous fluid is applied to the body along a plurality of circumferential bands and wherein predetermined volumes of viscous material are applied to the body uniformly along each such circumferential band whereby the thickness of the layer at each such position is controlled.

22. The method of claim 21 further including the steps of selecting the number of circumferential bands and the amount of material contained by each band whereby the contour of the layer of material is controlled.

* * * * *